United States Patent Office 2,751,372
Patented June 19, 1956

2,751,372

HIGHLY UNSATURATED POLYMERS DERIVED FROM POLYMERIC ISOPROPENYL ACYLATES

Erle W. Taylor and Cornelius C. Unruh, Rochester, N. Y., assignors to Eastman Kodak Company, Rochester, N. Y., a corporation of New Jersey No Drawing. Application September 23, 1954, Serial No. 458,002

10 Claims. (Cl. 260—78.5)

This invention relates to synthetic polymers containing a high degree of unsaturation, and more particularly to resinous pyrolysis products of isopropenyl carboxylate polymers, and to a process for preparing the same.

It is known that polyvinyl carboxylates will split off carboxylic acids when heated to temperatures where thermal degradation occurs. For example, N. Grassie, Transactions of the Faraday Society, vol. 48, pages 379–387 (1952) shows that when polyvinyl acetate is heated in a molecular still under vacuum conditions acetic acid is evolved, and as the heating continues the residue remaining in the still progressively darkens in color and very quickly becomes insoluble in common organic solvents. Such pyrolysis products have only limited commercial applications. From this result, it would be expected that related synthetic polymers containing carboxyl groups would similarly on pyrolysis give insoluble residues. It was very surprising, therefore, to find that when we subjected isopropenyl carboxylate polymers, and more particularly isopropenyl acetate polymers, to elevated temperatures in the substantial absence of oxygen, for example, under vacuum conditions or under an atmosphere of inert gas such as nitrogen, carbon dioxide, etc., carboxylic acids corresponding to the particular isopropenyl carboxylate employed were split off, but the residue of polymer remaining in the reaction vessel in each case was only slightly colored and readily soluble in common organic solvents such as acetone, ethyl acetate, butyl acetate, glacial acetic acid, carbon tetrachloride and other chlorinated hydrocarbons, etc. These residual polymers are further characterized by insolubility in the lower aliphatic alcohols such as methanol and ethanol, and by a high degree of unsaturation as evidenced by their absorption of bromine on contact therewith. However, the chemical constitution of our pyrolyzed resinous products is not accurately known. They are particularly useful as substitutes for naturally occurring oils such as linseed, tung oils, etc. in the paint and varnish industries, as well as in the preparation of printing inks. Their usefulness in the above-mentioned arts is due to the fact that thin layers thereof on exposure to the atmosphere absorb oxygen therefrom and become converted to hard, completely insoluble, non-tacky layers or coatings in a few hours, even without the addition of the usual driers that are necessary with the above mentioned kind of naturally occurring oils.

It is, accordingly, an object of our invention to provide a new class of highly unsaturated resinous polymers which become hard and insoluble on exposure to oxygen. Another object is to provide a process for their preparation. Other objects will become apparent hereinafter.

In accordance with the invention, we prepare our new class of highly unsaturated polymers by heating an isopropenyl carboxylate polymer under conditions excluding oxygen or in a substantially inert, oxygen-free atmosphere such as nitrogen, carbon dioxide, etc., at a temperature of from about 190° to 250° C., until substantially all or most of the available carboxylic acid in the isopropenyl carboxylate polymer has split off and been removed by a distillation process. The residual polymer is usually a light yellow or amber color which is relatively soft and somewhat tacky at room temperature. Where an oxygen-free inert atmosphere is employed, the pressure can be maintained at normal, below normal or above normal atmospheric pressure as desired. However, the preferred procedure is to carry out the pyrolysis reaction under essentially vacuum conditions. A continuous process wherein the starting polymers are passed continuously through a heated zone and the resinous product continuously withdrawn as formed can also be advantageously employed.

Suitable isopropenyl carboxylate polymers for practicing our invention include homopolymers and copolymers of isopropenyl carboxylates having the general formula:

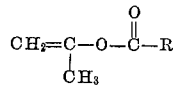

wherein R represents an alkyl group of from 1 to 3 carbon atoms or phenyl e. g. isopropenyl acetate, isopropenyl propionate, isopropenyl butyrate, and isopropenyl benzoate. Polyisopropenyl acetate is the preferred polymer. The homopolymers may be prepared by polymerizing the monomers in emulsion or in solution, but preferably in mass, by heating the particular monomer in the presence of a substantial amount of a peroxide polymerization catalyst such as benzoyl peroxide, acetyl peroxide, potassium persulfate, etc., for example, from about 5 to 20%, based on the weight of the monomer, at a temperature of from about 50°–100° C., for a period of time sufficient to give a resinous homopolymer as described hereinafter. The copolymers of the above isopropenyl carboxylates are binary copolymers and include those prepared with comonomers such as the mono- and dialkyl esters of maleic and fumaric acids, wherein the alkyl group contains from 1 to 4 carbon atoms e. g. monomethyl fumarate, monomethyl maleate, dimethyl fumarate, diethyl fumarate, diethyl maleate, etc., maleic anhydride, fumaronitrile, vinyl chloride, acrylonitrile, maleinimide, N-alkyl substituted maleinimides, etc. The preferred binary copolymers are those prepared from any of the mentioned isopropenyl carboxylates, and more especially from isopropenyl acetate, and dialkyl esters of fumaric and maleic acid such as described by W. O. Kenyon et al. in U. S. Patent No. 2,448,531, dated September 7, 1948. The binary copolymers of our invention contain the components in about a 1:1 molecular ratio.

The following examples will serve further to illustrate the invention.

Example 1

2000 g. of redistilled isopropenyl acetate were mixed with 100 g. of benzoyl peroxide in a 5-liter glass container. The supernatant atmosphere was flushed out with nitrogen and the closed container containing the mixture was then heated in a 60° C. bath for a period of 10 days. The thinly viscous solution obtained, yellow in color, was poured into hot water and thoroughly steamed out to remove any remaining monomer. A pale yellow, brittle resin was obtained on cooling, weighing 1225 g. It was soluble in alcohols, particularly methanol and ethanol, and had a softening point of approximately 82° C.

70 g. of the polyisopropenyl acetate prepared above were placed into a glass flask and heated in an oil bath, the system being evacuated by means of a water pump. When the oil bath had attained a temperature of 200° C., frothing and effervescence were noticeable, and at an oil bath temperature of 210° C. a colorless liquid distilled over and was collected in a chilled receiver. The bath temperature was maintained at 210°–215° C. for one hour, at the end of which time 33 g. of distillate having a melting point of 13°–14° C., a boiling point of about 115° C. and a refractive index at 25° C. of 1.3802 had been collected. The distillate was largely acetic acid, but the presence of some impurity was evident in that on standing it gradually darkened in color.

The residue in the flask was an amber colored mass which was allowed to cool in vacuo. This procedure was necessary, since the hot residue on contact with air rapidly becomes insoluble. The cooled residue, on the other hand, was found to be quite stable to air. It was soft and somewhat tacky at room temperatures (25°–30° C.) and soluble in acetone, ethyl acetate, carbon tetrachloride and other halogenated hydrocarbons, but insoluble in alcohols such as methanol and ethanol. One gram of the cooled residue was dissolved in 10 cc. of carbon tetrachloride and to this was added a solution of 5 g. of bromine in 15 cc. of carbon tetrachloride while being kept cold. The fine precipitate which formed was rapidly filtered off by suction, dried in a vacuum desiccator over potassium hydroxide and twice dissolved in chloroform and poured into agitated methanol. The final yellow powdery product was dried at 40° C. Analysis of this powder gave a content of 59.5% by weight of bromine as compared with only a trace of bromine found in the product obtained when the original polyisopropenyl acetate was brominated under exactly the same conditions. This result clearly indicated that the pyrolysis process above described resulted in a highly unsaturated resinous material.

A solution of some of the remaining cooled resinous residue from the flask in butyl acetate was prepared and poured onto a glass plate and the thin coating allowed to stand at room temperature. In two hours, the coating had set and was free from tackiness, and after standing overnight, it was hard and no longer soluble in butyl acetate.

In place of the polyisopropenyl acetate in the above example, there can be substituted an equivalent amount of polyisopropenyl propionate or polyisopropenyl butyrate or an isopropenyl benzoate to give generally similar residual polymers, the process differing primarily in the splitting off of propionic, butyric or benzoic acids, respectively, instead of acetic acid.

*Example 2*

120 g. of polyisopropenyl acetate prepared as described in Example 1 were placed in a 500 cc. flask fitted to a condenser and a receiver chilled in ice water. The system was evacuated through a dry ice trap using a water pump. The flask was heated by an oil bath. When the temperature reached 100° C., the pale yellow, rosin-like polymer began to fuse and volatiles began to distill off. At a bath temperature of 200°–210° C. the effervescence was vigorous. The bath temperature was maintained at 210°±5° C. for about one hour. At the end of this time, the residue in the flask was slightly viscous and dark amber in color. On cooling in vacuo, this residue was non-flowing and slightly tacky, but became harder on standing in the atmosphere. The weight obtained of this residue was 57 g., while total weight of distillate, which was largely glacial acetic acid, weighed 53 g. The loss on distillation (by difference) was 10 g. The resinous polymer or residue was dissolved in an equal weight of acetone. A small amount of this solution or dope was coated on a glass plate and allowed to stand at room temperature. On evaporation of the solvent, the coating was tacky, but on standing overnight a clear, hard, non-tacky coating, which was no longer soluble in acetone, was obtained.

*Example 3*

50 g. of a copolymer of isopropenyl acetate and diethyl fumarate in the molecular proportions of approximately 1:1 of these components (in the form of beads) were heated in a flask in vacuo (7 mm. pressure), at an oil bath temperature of 230°–240° C. for a period of 5 hours. A total of 8.5 cc. of acetic acid were collected in the distillate trap. The residue was a viscous, clear, pale yellow mass, which was soluble in acetone and coatings made from such solution were clear and non-tacky. On standing in the atmosphere, the coating was no longer soluble in acetone.

One gram of the above residue was dissolved in 10 cc. of glacial acetic acid, and to this was added one gram of bromine dissolved in 15 cc. of glacial acetic acid. The mixture was allowed to stand in the dark for 20 minutes and then poured into an excess of cold water, the precipitate obtained being filtered out, washed thoroughly with cold water and dried. Analysis of the precipitated product gave a content of 17.5% by weight of bromine, compared with only a trace of bromine found in the product obtained when one gram of the original non-pyrolyzed copolymer was brominated under exactly the same conditions. This result indicates that the acetone soluble residue resulting from the pyrolysis of the above copolymer contained a high proportion of unsaturated bonds.

In place of the 1:1 copolymer in the above example, there can be substituted a like amount of a 1:1 copolymer of isopropenyl acetate and dimethyl fumarate, a 1:1 copolymer isopropenyl acetate and dibutyl fumarate, a 1:1 copolymer of isopropenyl acetate and monomethyl fumarate or corresponding isopropenyl acetate-maleate copolymers, etc. to give generally similar highly unsaturated residual polymers.

By proceeding in accordance with the above examples, other species of resinous residual polymers coming within the invention can also be prepared, for example, from 1:1 copolymers of any of the isopropenyl esters, but preferably isopropenyl acetate, with maleic anhydride, fumaronitrile, vinyl chloride, acrylonitrile, maleinimide or N-alkyl substituted derivatives of maleinimide.

What we claim is:

1. A process for preparing a resinous polymer having a high degree of unsaturation which comprises heating a resinous polymer selected from the group consisting of (1) a homopolymer of an isopropenyl carboxylate having the general formula:

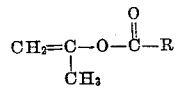

wherein R represents a number selected from the group consisting of an alkyl group containing from 1 to 3 carbon atoms and phenyl, and (2) an approximately 1:1 copolymer of the said isopropenyl carboxylate and a monomer selected from the group consisting of a dialkyl fumarate wherein each alkyl group contains from 1 to 4 carbon atoms and a dialkyl maleate wherein each alkyl group contains from 1 to 4 carbon atoms, at a temperature of from 190° to 250° C., substantially in the absence of oxygen, until substantially all of the available carboxylic acid in the said isopropenyl carboxylate of the said polymer has been split off to give said resinous polymer having a high degree of unsaturation.

2. A process for preparing a resinous polymer having a high degree of unsaturation which comprises heating a resinous polyisopropenyl carboxylate, wherein the carboxylate group is the radical of a saturated fatty acid containing from 2 to 4 carbon atoms, at a temperature of from 190° to 250° C., substantially in the absence of oxygen, until substantially all of the available carboxylic acid in the said polyisopropenyl carboxylate has been split off to give said resinous polymer having a high degree of unsaturation.

3. A process for preparing a resinous polymer having a high degree of unsaturation which comprises heating resinous polyisopropenyl acetate at a temperature of from 190° to 250° C., substantially in the absence of oxygen, until substantially all of the available acetic acid in the said polyisopropenyl acetate has been split off to give the said resinous polymer having a high degree of unsaturation.

4. A process for preparing a resinous polymer having a high degree of unsaturation which comprises heating resinous polyisopropenyl acetate at a temperature of from 190° to 250° C., under substantially vacuum conditions, until substantially all of the available acetic acid in the said polyisopropenyl acetate has been split off to give the said resinous polymer having a high degree of unsaturation.

5. A process for preparing a resinous polymer having a high degree of unsaturation which comprises heating resinous polyisopropenyl acetate at a temperature of from 200° to 215° C., under substantially vacuum conditions, until substantially all of the available acetic acid in the said polyisopropenyl acetate has been split off to give the said resinous polymer having a high degree of unsaturation.

6. A process for preparing a resinous polymer having a high degree of unsaturation which comprises heating an approximately 1:1 molar ratio resinous copolymer of isopropenyl acetate and diethyl fumarate, at a temperature of from 230° to 240° C., under substantially vacuum conditions, until substantially all of the available acetic acid in the said isopropenyl acetate component of the said copolymer has been split off to give the said resinous polymer having a high degree of unsaturation.

7. A resinous polymer having a high degree of unsaturation obtained by the process of claim 1.

8. A resinous polymer having a high degree of unsaturation obtained by the process of claim 2.

9. The resinous polymer having a high degree of unsaturation obtained by the process of claim 5.

10. The resinous polymer having a high degree of unsaturation obtained by the process of claim 6.

References Cited in the file of this patent
UNITED STATES PATENTS
2,060,035   Chaney et al. _____ Nov. 10, 1936